(12) United States Patent
Zhang (10) Patent No.: US 10,512,983 B2
(45) Date of Patent: Dec. 24, 2019

(54) METHOD AND APPARATUS FOR MEASUREMENT OF THREE-DIMENSIONAL WELDING TORCH ORIENTATION FOR A WELDING PROCESS WITHOUT USING A MAGNETOMETER

(71) Applicant: ILLINOIS TOOL WORKS INC., Glenview, IL (US)

(72) Inventor: YuMing Zhang, Nicholasville, KY (US)

(73) Assignee: University of Kentucky Research Foundation, Lexington, KY (US)

(*) Notice: Subject to any disclaimer, the term of this patent is extended or adjusted under 35 U.S.C. 154(b) by 786 days.

(21) Appl. No.: 15/172,425

(22) Filed: Jun. 3, 2016

(65) Prior Publication Data
US 2016/0361776 A1 Dec. 15, 2016

Related U.S. Application Data

(60) Provisional application No. 62/175,599, filed on Jun. 15, 2015.

(51) Int. Cl.
| | |
|---|---|
| *B23K 9/095* | (2006.01) |
| *B23K 9/12* | (2006.01) |
| *B23K 9/28* | (2006.01) |
| *G01C 25/00* | (2006.01) |
| *G09B 19/24* | (2006.01) |

(52) U.S. Cl.
CPC .......... *B23K 9/0953* (2013.01); *B23K 9/0956* (2013.01); *B23K 9/126* (2013.01); *B23K 9/287* (2013.01); *G01C 25/005* (2013.01); *G09B 19/24* (2013.01)

(58) Field of Classification Search
CPC .... B23K 9/0953; B23K 9/0956; B23K 9/126; B23K 9/287; B23K 9/095; B23K 9/1012; B23K 9/1043; B23K 9/12; B23K 9/28; G01C 25/005; G09B 19/24
See application file for complete search history.

(56) References Cited

U.S. PATENT DOCUMENTS

| | | | | |
|---|---|---|---|---|
| 4,815,006 | A * | 3/1989 | Andersson ........... | B23K 9/1274 700/254 |
| 4,954,762 | A * | 9/1990 | Miyake .............. | G05B 19/4182 219/124.34 |
| 6,122,538 | A * | 9/2000 | Sliwa, Jr. ................. | A61B 8/00 324/207.14 |
| 8,457,786 | B2 * | 6/2013 | Andersson ........... | G05B 19/401 33/558.2 |
| 2011/0004439 | A1 | 1/2011 | Tanabe et al. | |
| 2012/0203487 | A1 | 8/2012 | Johnson | |

(Continued)

FOREIGN PATENT DOCUMENTS

EP     2537620 A1     12/2012

OTHER PUBLICATIONS

Int'l Search Report and Written Opinion for PCT/US2015/067888 dated Jul. 8, 2016 (16 pages).

(Continued)

*Primary Examiner* — David J Walczak
(74) *Attorney, Agent, or Firm* — McAndrews, Held & Malloy, Ltd.

(57) ABSTRACT

A welding system configured to calibrate a welding torch's orientation without using a magnetometer.

22 Claims, 8 Drawing Sheets

(56) References Cited

U.S. PATENT DOCUMENTS

| | | |
|---|---|---|
| 2013/0206741 A1 | 8/2013 | Pfeifer et al. |
| 2014/0129170 A1 | 5/2014 | Ramachandran et al. |
| 2014/0144895 A1 | 5/2014 | Stork Genannt Wersborg et al. |
| 2014/0272836 A1 | 9/2014 | Becker |
| 2014/0352400 A1 | 12/2014 | Barrilado et al. |
| 2015/0154884 A1 | 6/2015 | Salsich et al. |

OTHER PUBLICATIONS

Fong W T et al: "Methods for in-field user calibration of an inertial measurement unit without external equipment; Methods for in-field user calibration of an IMU without external equipment", Measurement Science and Technology, IOP, Bristol, GB, vol. 19, No. 8, Aug. 1, 2008 (Aug. 1, 2008), p. 85202, XP020144339, ISSN: 0957-0233 section 4.

Tedaldi David et al: "A robust and easy to implement method for IMU calibration without external equipments", 2014 IEEE International Conference on Robotics and Automation (ICRA), IEEE, May 31, 2014 (May 31, 2014), pp. 3042-3049, XP032650121, DOI: 10.1109/ICRA.2014.6907297 sections III and IV.

Isaac Skog et al: "Calibration of a MEMS Inertial Measurement Unit", XVII IMEKO World Congress Metrology for a Sustainable Development, Sep. 17, 2006 (Sep. 17, 2006), XP055268002, Retrieved from the Internet: URL:http://www.imeko.org/publications/wc-2006/PWC-2006-TC3-017u.pdf [retrieved on Apr. 22, 2016] section 3.

Int'l Search Report and Written Opinion for PCT/US2016/037413 dated Sep. 1, 2016 (14 pages).

Mark Pedley: "Tilt Sensing Using a Three-Axis Accelerometer", Mar. 30, 2013 (Mar. 30, 2013), pp. 5-10, XP055296059, Retrieved from the Internet: URL:https://www.nxp.com/files/sensors/doc/app_note/AN3461.pdf [retrieved on Aug. 17, 2016] (22 pages).

\* cited by examiner

METHOD AND APPARATUS FOR MEASUREMENT OF THREE-DIMENSIONAL WELDING TORCH ORIENTATION FOR A WELDING PROCESS WITHOUT USING A MAGNETOMETER

PRIORITY CLAIM

This application claims priority to the following application(s), each of which is hereby incorporated herein by reference:

U.S. provisional patent application 62/175,599 titled "Measurement Of Three-Dimensional Welding Torch Orientation For Manual Arc Welding Process Without Using A Magnetometer" filed on Jun. 15, 2015.

BACKGROUND

The present disclosure relates to a welding machine, and more particularly, to a method and apparatus for measurement of three-dimensional welding torch orientation for a welding process without using a magnetometer.

Limitations and disadvantages of conventional approaches to welding will become apparent to one of skill in the art, through comparison of such approaches with some aspects of the present method and system set forth in the remainder of this disclosure with reference to the drawings.

SUMMARY

Methods and apparatus are provided for measurement of three-dimensional welding torch orientation for a welding process without using a magnetometer, substantially as illustrated by and described in connection with at least one of the figures, and as set forth more completely in the claims.

BRIEF DESCRIPTION OF THE DRAWINGS

These and/or other aspects will become apparent and more readily appreciated from the following description of the exemplary embodiments, taken in conjunction with the accompanying drawings.

DETAILED DESCRIPTION

Welding power, as used herein, refers to power suitable for use by a welding torch for welding, plasma cutting, induction heating, air carbon-arc cutting and/or gouging (CAC-A), cladding, and/or hot wire welding/preheating (including laser welding and laser cladding).

A welding system, as used herein, may comprise any device capable of supplying welding power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

Various embodiments of the disclosure comprise a welding system that includes a sensor, mounted rigidly to a welding torch, configured to output a first output, a second output, and a third output corresponding to a first axis, a second axis, and a third axis of a coordinate system, respectively, where the first axis, the second axis, and the third axis are mutually orthogonal to each other. The welding controller is configured to determine, based on the first output, the second output, and the third output, a first rotational angle for the sensor to determine a first intermediate coordinate system with respect to a reference coordinate system, and a second rotational angle for the sensor to determine a second intermediate coordinate system with respect to the first intermediate coordinate system. The welding controller is also configured to calibrate an orientation of the sensor based on the second intermediate coordinate system.

The welding controller is further configured to determine the orientation of the sensor, velocity of the sensor, and/or a position of the sensor based on the calibrated orientation and further updates of the first output, the second output, and the third output from the sensor. The sensor is an accelerometer, and the welding system does not use outputs from a magnetometer if the magnetometer is included in the welding system. Various embodiments of the welding system do not include a magnetometer.

The welding controller is configured to determine the first intermediate coordinate system as the reference coordinate system rotated around its second axis by the first rotational angle, and to determine the second intermediate coordinate system as the first intermediate coordinate system rotated around its third axis by the second rotational angle.

The welding controller is configured to determine the calibrated orientation when the first output, the second output, and the third output indicate constant acceleration. The welding controller is configured to determine the first rotational angle using the equation of $\varphi_1 = \tan^{-1}(\sqrt{a_1^2 + a_2^2}/a_3)$, and the second rotational angle using the equation of $\varphi_2 = \tan^{-1}(a_2/a_1)$, where $\varphi_1$ is the first rotational angle, $\varphi_2$ is the second rotational angle, $a_1$ is the first output, $a_2$ is the second output, and $a_3$ is the third output.

The first rotation angle and the second rotational angle may be calculated and/or looked up in a look-up table. The look-up table may be generated by the welding controller or downloaded or received from an external system.

The welding system may comprise a robot controller to control a robot holding the welding torch, and the welding controller is configured to control a velocity and/or position of the welding torch based on the orientation of the sensor.

Various embodiments of the disclosure also include a system without a magnetometer, where a rigidly mounted sensor is configured to output a first output, a second output, and a third output corresponding to a first axis, a second axis, and a third axis of a coordinate system, respectively, where the first axis, the second axis, and the third axis are mutually orthogonal to each other. The system also includes a processor configured to determine, based on the first output, the second output, and the third output, a first rotational angle for the sensor to determine a first intermediate coordinate system with respect to a reference coordinate system, and a second rotational angle for the sensor to determine a second intermediate coordinate system with respect to the first intermediate coordinate system. The processor is configured to determine a calibrated orientation of the sensor based on the second intermediate coordinate system. The processor is further configured to determine an orientation, velocity, and/or position of the sensor based on the calibrated orientation and further updates of the first output, the second output, and the third output from the sensor.

Various embodiments of the disclosure may also comprise a non-transitory machine-readable medium storing machine executable instructions that when executed causes a computing system to control operations for determining an orientation of a sensor mounted rigidly to a tool with respect to a reference coordinate system for controlling the tool by determining, based on a first output, a second output, and a third output of the sensor, a first rotational angle for the sensor to determine a first intermediate coordinate system with respect to the reference coordinate system, where the first output, the second output, and the third output correspond to a first axis, a second axis, and a third axis of a coordinate system, respectively, that are mutually orthogonal to each other. The executed instructions may also determine, based on the first output, the second output, and the third output, a second rotational angle for the sensor to determine a second intermediate coordinate system with respect to the first intermediate coordinate system. Accordingly, further execution of the instructions may determine a calibrated orientation of the sensor based on the second intermediate coordinate system.

The non-transitory machine-readable medium further comprises instructions that cause the processor to determine at least one of an orientation of the sensor, velocity of the sensor, and a position of the sensor based on the calibrated orientation and further updates of the first output, the second output, and the third output from the sensor.

The instructions cause the processor to process the relationship between the reference coordinate system and the second intermediate coordinate system as the reference coordinate system rotated around its second axis by the first rotational angle to form the first intermediate coordinate system, and the first intermediate coordinate system rotated around its third axis by the second rotational angle, and the first output, the second output, and the third output are from an accelerometer, and the instructions cause the processor to determine the orientation of the sensor without using a magnetometer output.

Figure 1:
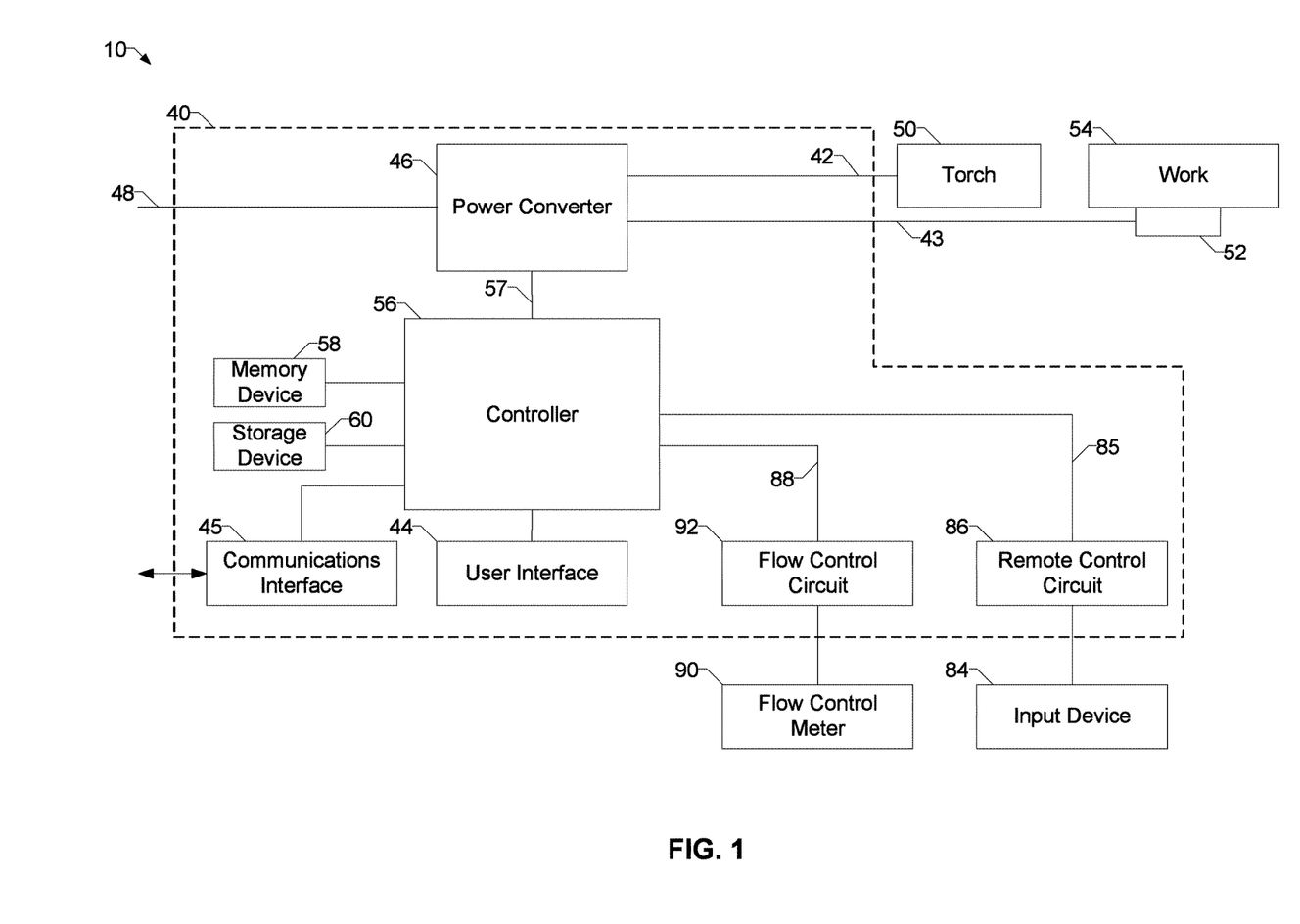
FIG. 1 shows an exemplary welding system in accordance with aspects of this disclosure.

The instructions cause the processor to determine the calibrated orientation when the first output, the second output, and the third output indicate constant acceleration. The processor is able to calculate the first rotational angle using $\varphi_1 = \tan^{-1}(\sqrt{a_1^2 + a_2^2}/a_3)$, and determine the second rotational angle using $\varphi_2 = \tan^{-1}(a_2/a_1)$, where $\varphi_1$ is the first rotational angle, $\varphi_2$ is the second rotational angle, $a_1$ is the first output, $a_2$ is the second output, and $a_3$ is the third output. Alternatively, the processor is able to determine the first rotational angle and the second rotational angle via a lookup table based on the first output, the second output, and the third output FIG. 1 is a block diagram illustrating an example welding system 10 including a power source 40. The power source 40 converts input power to AC and/or DC power suitable for use in welding operations, such as TIG, stick welding, and/or Submerged Arc Welding (SAW), and/or in gouging operations such as air carbon arc gouging. The power source 40 permits an operator to use the power source 40 for gouging and/or welding by selecting the appropriate operation via a user interface 44, and attaching the appropriate welding equipment, (e.g. a gouging torch and gas supply for air carbon arc gouging, a torch and gas supply for TIG welding, or an electrode holder for shielded metal arc welding (SMAW), etc.).

The power source 40 includes a power converter 46. The power converter 46 receives input power from a power input 48 and converts the power input 48 to either AC and/or DC welding power for output to a torch 50 connected to power outputs 42, 43. In the example of FIG. 1, the torch 50 is connected to the power output 42 and a work clamp 52 is connected to a power output 43 to form an electrical circuit with a workpiece 54 when an electrical arc is started.

The power converter 46 is a phase-controlled power source, which may use silicon controlled rectifiers (SCRs) to convert power received at power input 48 to usable welding and/or gouging power. Additionally or alternatively, the power converter 46 may use DC chopper circuitry and/or any other power conversion topology.

The power source 40 includes a controller 56 that is operatively coupled to the power converter 46. The controller 56 may also be referred to as a welding processor. The controller 56 may be implemented using one or more logic circuits, such as one or more "general-purpose" microprocessors, one or more special-purpose microprocessors and/or application-specific integrated circuits (ASIC), field programmable gate arrays (FPGA)s, digital signal processors (DSPs), and/or any other type of logic and/or processing device. For example, the controller 56 may include one or more digital signal processors (DSPs). Alternatively, the controller 56 could include discrete component control circuitry to perform these control functions. The controller 56 controls the output power from power converter 46 by generating control signals 57 to control switching components (e.g., the SCRs) in power converter 46.

The controller 56 receives user-selected operating parameters from user interface 44, such as an amperage (e.g., electrical current) selection. For example, the user interface 44 includes selectors (not shown) operable by the user to select a welding process (e.g., gouging, TIG, STICK, etc.), an amperage control (PANEL/REMOTE), an output control (ON/REMOTE), a start mode (OFF/LIFT/HFSTART/HF-CONT), a positive/negative balance control for AC TIG welding, a DIG control for STICK welding, an amperage level, a spot welding operation, and/or a sequence selection such as start current, final (crater) current, or both. The controller 56 also transmits to the user interface 44 information about the welding operation that is valuable to the welder, including arc voltage, arc amperage, and/or preferred selector settings. The example user interface 44 may include any type of interface device, such as a keyboard, a pointing device (e.g., a mouse, a trackpad), a microphone, a camera (e.g., gesture-based input), a touchscreen, and/or any other type of user input and/or output device.

The controller 56 may also be configured to control various aspects of the welding system 10. For example, the controller 56 may control input and output via the user interface 44 and/or the communications interface 45. As described above, the controller 56 may generically refer to a plurality of devices, including processors, which work in concert to control various aspects of the welding system 10.

In some examples, the welding system 10 may receive information via the communication interface 45. The communication interface 45 may receive information such as, for example, updates to any software/firmware that may be used by the welding system 10 or the amperage parameter from another device instead of via the user interface 44. For example, the information such as the amperage parameter may be received via a wired and/or wireless communication from a computing device (e.g., a computer, a server, a mobile device, cloud storage, etc.), a wired and/or wireless point-to-point connection (e.g., Bluetooth®, near-field communications, USB, etc.), a control cable communication with another welding device, a weld cable communication from another welding device, a communication with a storage device such as a portable storage device (e.g., a FLASH drive or other USB-capable storage, a secure digital (SD) card, etc.), and/or via any other communications method. Various embodiments of the disclosure may also allow the welding system 10 to transmit information via wired and/or wireless communication. The transmitted information may be, for example, commands, status, and/or other information that may be requested by other devices/servers/etc. The information communicated between the welding system 10 and another device may also be, for example, to allow control of the welding system 10 by another device.

Some embodiments may allow wireless or wired communication between two parts of the welding system 10. For example, the torch 50 may transmit wirelessly its location and angular orientation to the controller 56 via the communications interface 45. The torch 50 may also transmit its location and angular orientation to the controller 56 via wired communication. One embodiment may allow the communication from the torch 50 to the controller 56 over the power output 42. Accordingly, a portion of the communications interface 45 may be considered to be in the power converter 46. There may also be communication from the controller 56 to the torch 50. The communication may indicate, for example, the status of the torch being used. The status may indicate whether the torch 50 is moving too slowly or too fast. The welder may then use the status to adjust the welding speed to ensure a good weld. The status may also indicate whether the torch 50 is, for example, outside optimal welding area.

A memory device 58 and a storage device 60 are coupled to the controller 56 for storing data including the settings of the selectors on user interface 44 for future retrieval after power-down and/or between welding cycles. The memory device 58 may include a volatile memory, such as random access memory (RAM), and/or a nonvolatile memory, such as read-only memory (ROM). The storage device 60 may include magnetic media such as a hard disk, solid state storage, optical media, and/or any other short and/or long term storage device. The memory device 58 and/or the storage device 60 may store information (e.g., data) for any purpose and/or transmit stored data upon request by the controller 56. For example, the memory device 58 and/or the storage device 60 may store processor executable instructions (e.g., firmware or software) for the controller 56 to execute. In addition, one or more control schemes for various welding processes, along with associated settings and parameters, may be stored in the memory device 58 and/or the storage device 60, along with code configured to provide a specific output (e.g., initiate wire feed, enable gas flow, capture welding current data, detect short circuit parameters, determine amount of spatter) during operation.

The memory device 58 may include a volatile memory, such as random access memory (RAM), and/or a nonvolatile memory, such as read-only memory (ROM). The memory device 58 may store a variety of information and may be used for various purposes. For example, the memory device 58 may store processor executable instructions (e.g., firmware or software) for the controller 56 to execute. In addition, one or more control regimes for various welding processes, along with associated settings and parameters, may be stored in the memory device 58 and/or the storage device 60, along with code configured to provide a specific output (e.g., initiate wire feed, enable gas flow, capture welding current data, detect short circuit parameters, determine amount of spatter) during operation. The memory device 58 may also store other data such as a look-up table for use by the welding system 10.

The controller 56 also receives remote control inputs 85 from an input device 84 through a remote control circuit 86. The input device 84 is user-operable and can be used to control welding power output. The flow of shield gas and/or gouging gas may also be controlled by controller 56. In this embodiment, a control signal 88 is sent from controller 56 via a path through a flow control circuit 92 to a flow control meter 90. Flow control meter 90 is coupled to a gas supply (not shown) for regulating the flow of shield gas and/or gouging gas from the gas supply to a welding site (e.g., to the torch 50). The flow control meter 90 may be internal or external to the power source 40 with a gas flow channel (not shown) extending from the gas supply, through power source 40, through flow control meter 90, then out to the 50 for provision to the site of the operation. The flow control circuit 92 could also be a submerged arc flux controller or a flux hopper controller.

While the example system 10 of FIG. 1 is described above with reference to performing actual welding operations, the system 10 may additionally or alternatively be used for weld training. For example, the controller 56 may be set (via the user interface 44 and/or the communications interface 45) to a training mode in which the power converter 46 does not output actual weld power, but the orientation and/or movement of the torch 50 are tracked to provide welder feedback. In other examples, the system 10 is a weld training device that is not capable of performing actual welding (e.g., omits the power converter 46) and instead provides a simulated welding environment.

Figure 2:
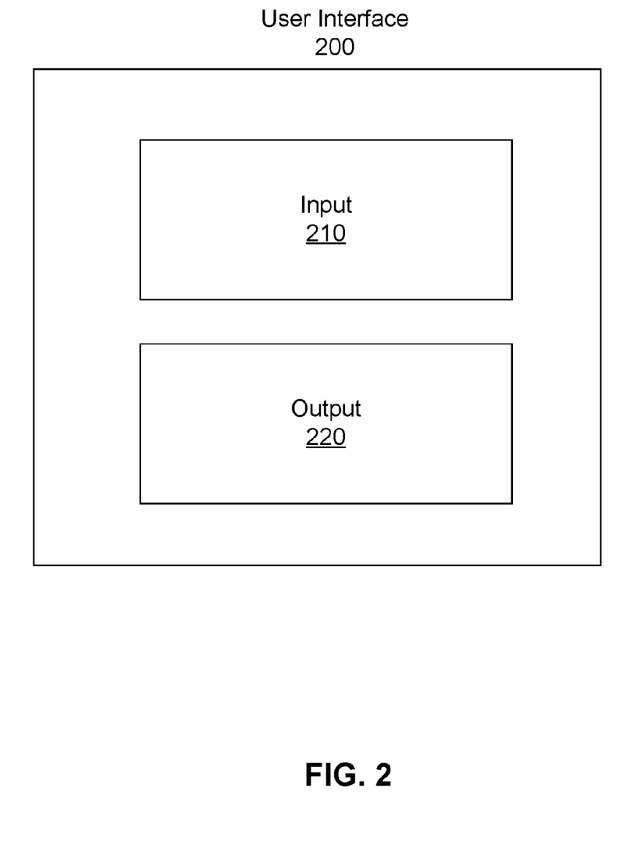
FIG. 2 is a block diagram of an exemplary user interface in accordance with aspects of this disclosure.

FIG. 2 is a block diagram of an exemplary user interface in accordance with aspects of this disclosure. Referring to FIG. 2, there is shown the user interface 200 comprising the input interface 210 and the output interface 220. The user interface 200 may be similar to the user interface 44 of FIG. 1. The input interface 210 may comprise any type of interface device, such as a keyboard, a pointing device (e.g., a mouse, a trackpad), a microphone, a camera (e.g., gesture-based input), a touchscreen, buttons that can be rotated and/or pushed, sliding knobs, and/or any other type of user input and/or output device. The output interface 220 may comprise any type of visual output device such as, for example, an LCD display, an LED display, etc., tactile feedback devices that may vibrate, audio output device such as speakers, and any other output devices that may be used to provide information or notice. The output interface 220 may also display, for example, status/commands that may be transmitted to the torch 50.

While the user interface 200 shows the input interface 210 and the output interface 220 as being separate, this depiction is strictly for ease of explanation and is not meant to limit any embodiment in any specific way.

Figure 3A:
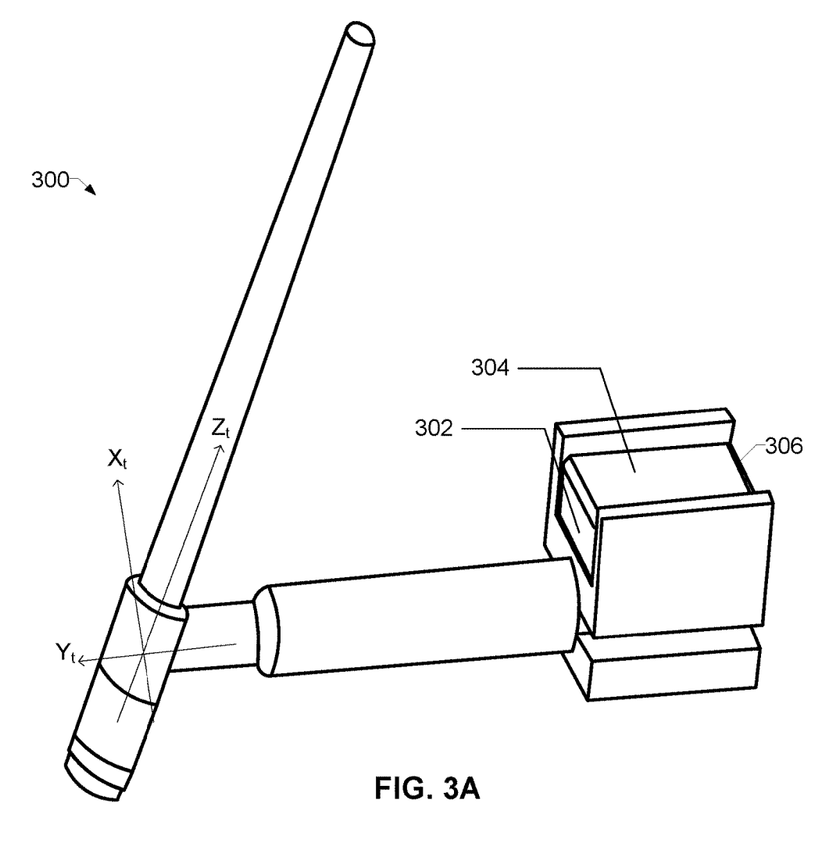
FIG. 3A is a diagram of an exemplary torch in accordance with aspects of this disclosure.

FIG. 3A is a diagram of an exemplary torch in accordance with aspects of this disclosure. Referring to FIG. 3A, there is shown a torch 300 that may be similar to torch 50 of FIG. 1. The torch 300 includes a torch controller 302, a display 304, and an inertial measurement unit (IMU) 306. The torch controller 302 comprises a processor similar to the controller 56, memory similar to the memory device 58 and/or the storage device 60, and communication interface similar to the communication interface 45. Accordingly, the torch controller 302 is able to process data and communicate with other devices. For example, the torch controller 302 may be able to process data from the IMU 306, control output to the display 304, and communicate with the controller 56 of FIG. 1. The display 304 may comprise LED lights, an LCD display that can show text and/or graphics, and/or a speaker. The IMU 306 may comprise one or more sensors such as, for example, accelerometer(s) and gyroscope(s). Other sensors may also be included in other embodiments as appropriate.

The IMU 306 may communicate its outputs, such as, for example, acceleration measurements and/or gyroscope measurements, to the torch controller 302. The torch controller 302 may then process the acceleration information to determine the velocity of the torch 300 and/or the angular orientation of the torch 300. By using time information, the torch controller 302 may also be able to determine a position of the torch 300 if the initial starting point is known. The torch controller 302 may then output to the display 304 to indicate, for example, whether the torch 300 is being held at an acceptable orientation or is being moved at an acceptable speed.

Various embodiments may use different configurations for processing data from the IMU 306 and displaying output based on the data from the IMU 306. For example, some embodiments may transmit the output of the IMU 306 to the controller 56 of FIG. 1, which may then process the output and control display of information by the output 220 and/or the display 304.

Figure 3B:
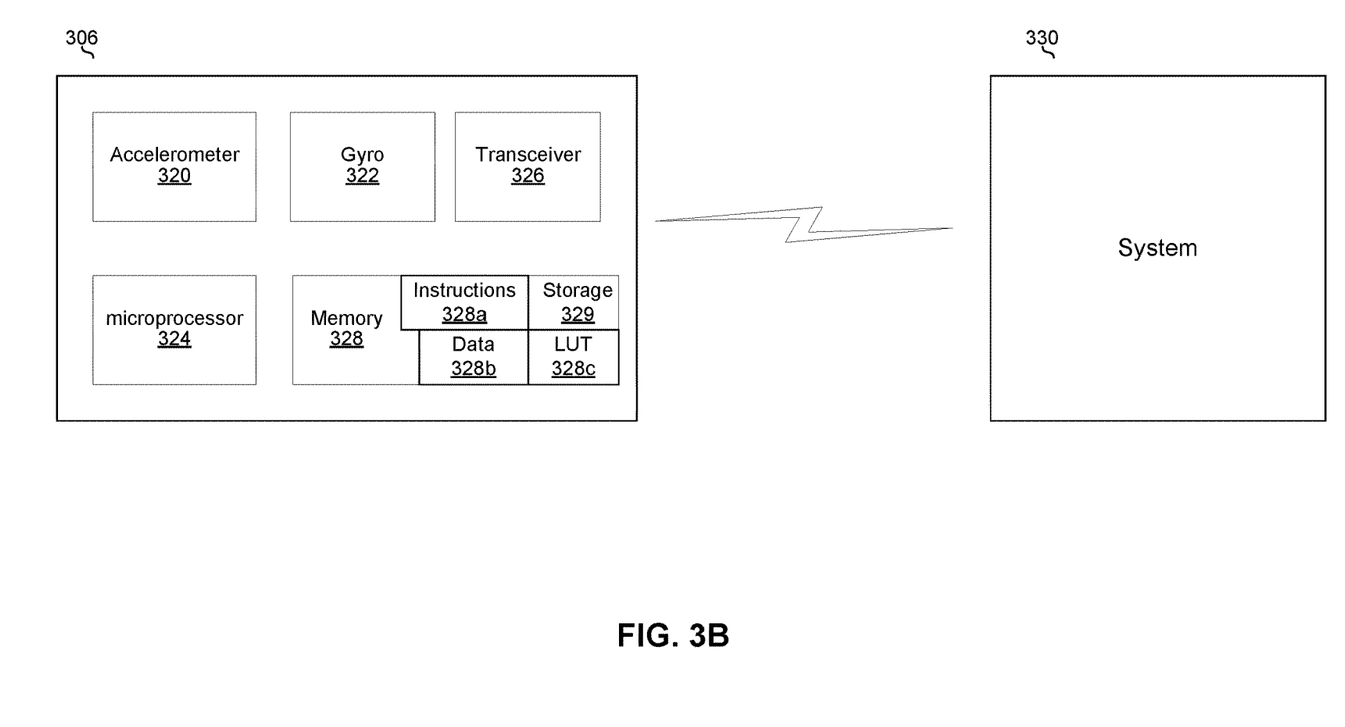
FIG. 3B is a diagram of an exemplary inertial measurement unit in accordance with aspects of this disclosure.

FIG. 3B shows a configuration where the IMU 306 includes the torch controller 302. FIG. 3B is a diagram of an exemplary IMU in accordance with aspects of this disclosure. Referring to FIG. 3B, there is shown the IMU 306 and a system 330. The IMU 306 comprises an accelerometer 320, a gyroscope 322, a microprocessor 324, a transceiver 326, and memory 328. The accelerometer 320 is a tri-axial device that is able to sense acceleration along three orthogonal axes. The gyroscope 322 is a tri-axial device that is able to sense angular change with respect to the three axes. The microprocessor 324 is similar to the controller 56. The transceiver 326 allows the IMU 306 to communicate with the system 330. The system 330 may be, for example, the power source 40 or a computer system. The transceiver 326 may allow wireless and/or wired communication with the system 330.

The memory 328 may be similar to the memory device 58, and may also comprise storage 329 similar to the storage device 60. The memory 328 can store various instructions 328a and data 328b, including one or more of look-up tables 328c. The instructions 328a, when executed, can use data 328b and look-up table 328c for various operations of the torch 50 and the welding system 10.

While the accelerometer 320 and the gyroscope 322 have been described as tri-axial devices, the various embodiments need not be so limited. For example, the accelerometer 320 may comprise a plurality of individual devices that together output acceleration for three axes. Similarly, the gyroscope 322 may also comprise a plurality of individual devices that together output angular change with respect to three axes.

Figure 4A:
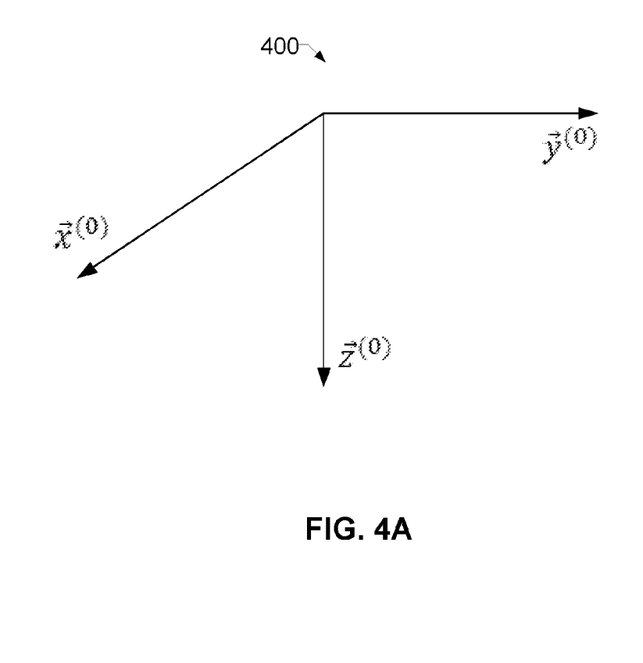
FIG. 4A is an illustration of a reference coordinate system in accordance with aspects of this disclosure.
Figure 4B:
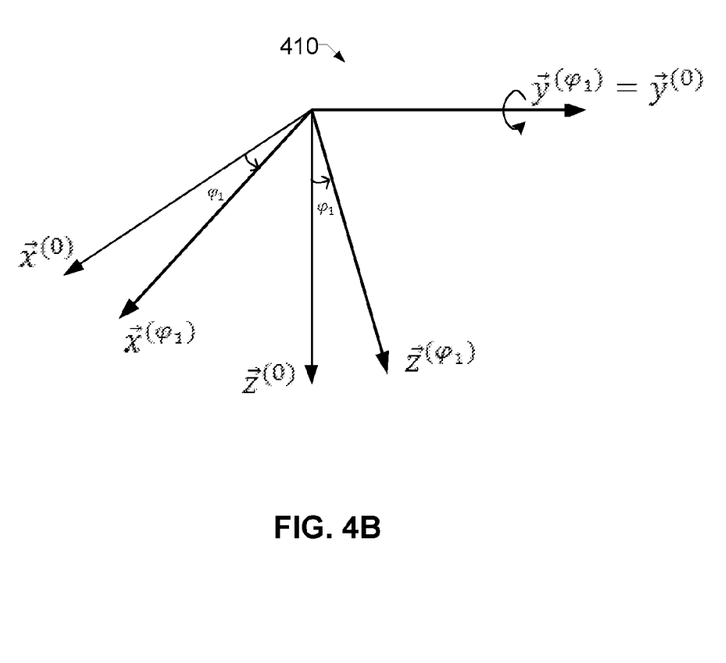
FIG. 4B is an illustration of a first intermediate coordinate system in accordance with aspects of this disclosure.
Figure 4C:
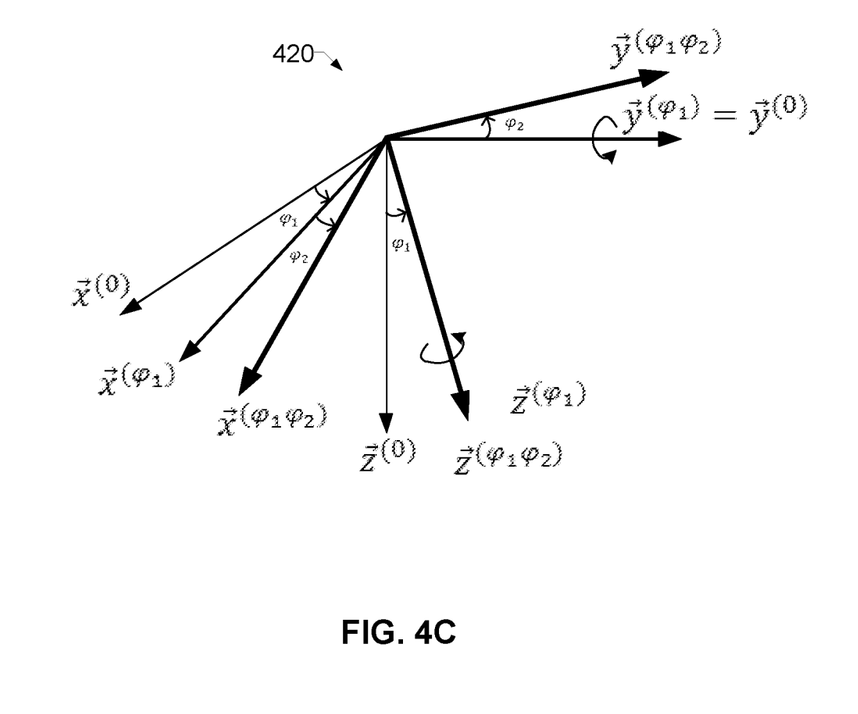
FIG. 4C is an illustration of a second intermediate coordinate system in accordance with aspects of this disclosure.

FIG. 4A shows the reference coordinate system 410 with mutually orthogonal axes $\vec{x}^{(0)}$, $\vec{y}^{(0)}$, $\vec{z}^{(0)}$. FIG. 4B shows the first intermediate coordinate system 420 with mutually orthogonal axes $\vec{x}^{(\varphi_1)}$, $\vec{y}^{(\varphi_1)}$, $\vec{z}^{(\varphi_1)}$, which is the reference coordinate system 410 rotated about the $\vec{y}^{(0)}$ axis by $\varphi_1$. FIG. 4C shows the second intermediate coordinate system 430 with mutually orthogonal axes $\vec{x}^{(\varphi_1\varphi_2)}$, $\vec{y}^{(\varphi_1\varphi_2)}$, $\vec{z}^{(\varphi_1\varphi_2)}$, which is the first intermediate coordinate system 420 rotated about the $\vec{z}^{(\varphi_1)}$ axis by $\varphi_2$.

Any orientation of the IMU 306 in its internal coordinate system ($\vec{x}$, $\vec{y}$, $\vec{z}$) can be realized by two rotations from the reference coordinate system ($\vec{x}^{(0)}$, $\vec{y}^{(0)}$, $\vec{z}^{(0)}$). For example, to get from the reference coordinate system ($\vec{x}^{(0)}$, $\vec{y}^{(0)}$, $\vec{z}^{(0)}$) to the internal coordinate system ($\vec{x}$, $\vec{y}$, $\vec{z}$) of the IMU 306, the reference coordinate system 410 ($\vec{x}^{(0)}$, $\vec{y}^{(0)}$, $\vec{z}^{(0)}$) can be rotated around $\vec{y}^{(0)}$ by angle $\varphi_1$ to get to the first intermediate coordinate system 420 ($\vec{x}^{(\varphi_1)}$, $\vec{y}^{(\varphi_1)}$, $\vec{z}^{(\varphi_1)}$), where $\vec{y}^{(\varphi_1)}=\vec{y}^{(0)}$. Then, the first intermediate coordinate system 420 can be rotated around $\vec{z}^{(\varphi_1)}$ by angle $\varphi_2$ to get to the second coordinate system 430 ($\vec{x}^{(\varphi_1\varphi_2)}$, $\vec{y}^{(\varphi_1\varphi_2)}$, $\vec{z}^{(\varphi_1\varphi_2)}$). The second coordinate system 430 ($\vec{x}^{(\varphi_1\varphi_2)}$, $\vec{y}^{(\varphi_1\varphi_2)}$, $\vec{z}^{(\varphi_1\varphi_2)}$) is the internal coordinate system of the IMU 306, and hence can be denoted by ($\vec{x}$, $\vec{y}$, $\vec{z}$).

Accordingly, any orientation of the IMU 306 can be fully described by two ordered angles ($\varphi_1$, $\varphi_2$) in relation to the reference coordinate system 410 ($\vec{x}^{(0)}$, $\vec{y}^{(0)}$, $\vec{z}^{(0)}$). This relationship can be used to calibrate the orientation of the IMU 306. This is described further with respect to FIG. 5. The internal coordinate system ($\vec{x}$, $\vec{y}$, $\vec{z}$) of the IMU 306 is the same as the internal coordinate system for the accelerometer 320.

Figure 5:
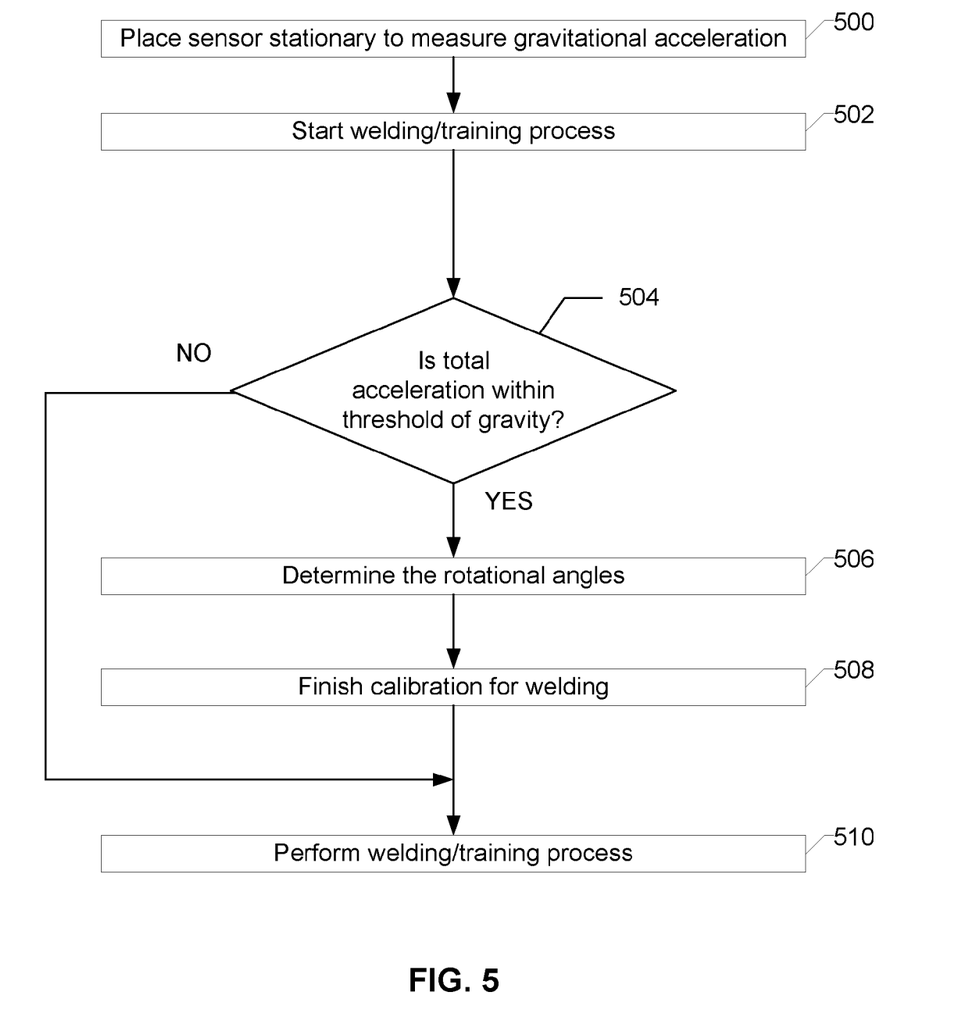
FIG. 5 is an exemplary flow diagram for calibrating and using an orientation of an inertial measurement unit in accordance with aspects of this disclosure.

FIG. 5 is an exemplary flow diagram for calibrating during welding/training processes and using an orientation of an inertial measurement unit in accordance with aspects of this disclosure. Referring to FIG. 5, at 500 the sensor, for example, the sensor 306, is placed in a stationary position to determine the magnitude of the gravitational acceleration $\hat{g}=\sqrt{a_x^2+a_y^2+a_z^2}$.

At 502 the welding/training process is started, and can include calibration of the sensor 306. The calibration may be started, for example, at a signal from the microprocessor 324, or the calibration may take place periodically, or the calibration may take place when certain conditions for an embodiment are met. For example, calibration may start when a command is entered via the input interface 210, or if there is an indication of welding/training start by pressing a trigger on the torch 50, or during periods of time during welding/training when there is constant acceleration within a threshold for a period of time. Other conditions may also be used to initiate calibration. Accordingly, calibration may take place prior to the welding system 10 being used or during use.

At 504 the microprocessor 324 determines whether the total acceleration measured by the accelerometer 320 is within a pre-determined threshold of the pre-estimated gravitational acceleration amplitude $\hat{g}$ obtained when the torch 50 was placed in a stationary position. The threshold is to determine whether the torch 50 has an acceleration close to the gravitational acceleration amplitude $\hat{g}$, i.e., if the torch 50 is substantially only subject to the gravitational acceleration. If the magnitude of the acceleration for the torch 50 is within a threshold with respect to the predetermined gravitational acceleration amplitude $\hat{g}$, then the outputs for the three axes $a_x$, $a_y$, and $a_z$ of the accelerometer 320 are judged to be caused by gravity, and the orientation of the accelerometer 320, and, hence, of the torch 50, can be calibrated.

If the acceleration output $a_x\vec{x}+a_y\vec{y}+a_z\vec{z}$ is constant and the magnitude of $a_x\vec{x}+a_y\vec{y}+a_z\vec{z}$ is close to $\hat{g}$ within a threshold, it can then be said the acceleration is most likely due to the gravitational acceleration $\vec{g}$. The gravitational acceleration $\vec{g}$ can be expressed as $\vec{g}=0\vec{x}^{(0)}+0\vec{y}^{(0)}+g\vec{z}^{(0)}$ where $\vec{x}^{(0)}$, $\vec{y}^{(0)}$, $\vec{z}^{(0)}$ are the unit vectors in the reference coordinate system 410, and g is the gravitational acceleration magnitude, which is known. More specifically, the gravitational acceleration $\vec{g}$ is fully sensed at the z-axis ($\vec{z}^{(0)}$) of the reference coordinate system 410, while the accelerometer 320 does not sense anything at the x- and y-axes ($\vec{x}^{(0)}$, $\vec{y}^{(0)}$) of the reference coordinate system 410.

Given this relationship, when the amplitude of the acceleration output $a_x\vec{x}+a_y\vec{y}+a_z\vec{z}$ is constant or close to $\hat{g}$ within a threshold, the first and second rotational angles $\varphi_1$ and $\varphi_2$ can be determined from the outputs of the three axes of the accelerometer, $a_x$, $a_y$, and $a_z$, where $\varphi_1$ can be determined using $a_z$ and $\sqrt{a_x^2+a_y^2}$, and $\varphi_2$ can be determined using $a_x$ and $a_y$.

At 506, the rotational angles $\varphi_1$ and $\varphi_2$ can be calculated using the following equations.

$$\varphi_1=\tan^{-1}(\sqrt{a_x^2+a_y^2}/a_z) \quad \text{Equation (1)}$$

$$\varphi_2=\tan^{-1}(a_y/a_x) \quad \text{Equation (2)}$$

Derivation of Equation (1) and Equation (2) is shown below.

Initially, the reference coordinate system 410 ($\vec{x}^{(0)}$, $\vec{y}^{(0)}$, $\vec{z}^{(0)}$) is aligned with the internal coordinate system ($\vec{x}$, $\vec{y}$, $\vec{z}$) of the accelerometer 320. After the first rotation about $\vec{y}^{(0)}$ (which is also the y-axis of the accelerometer 320) by angle $\varphi_1$, the gravitational acceleration is projected on the z-axis of the accelerometer 320 at the angle $\varphi_1$ such that $a_z=g\cos\varphi_1$. The rest is projected onto the x-axis as $a_x=g\sin\varphi_1$. There is no gravitational acceleration $a_y$ since the y-axis has not changed.

After the second rotation about the new z-axis ($\vec{z}^{(\varphi_1)}$) of the accelerometer 320 by angle $\varphi_2$, $a_z=g\cos\varphi_1$ does not change, but $g\sin\varphi_1$ will redistribute to the new x- and y-axes of the accelerometer such that $a_x=(g\sin\varphi_1)\cos\varphi_2$ and $a_y=(g\sin\varphi_1)\sin\varphi_2$ for the second intermediate coordinate system.

Accordingly, the outputs at the three axes of the accelerometer 320 are:

$$a_x=(g\sin\varphi_1)\cos\varphi_2 \quad \text{Equation (3)}$$

$$a_y=(g\sin\varphi_1)\sin\varphi_2 \quad \text{Equation (4)}$$

$$a_z=g\cos\varphi_1. \quad \text{Equation (5)}$$

For the first angular rotation by angle $\varphi_1$, usage of Equations (3) and (4) leads to $$\sqrt{a_x^2+a_y^2}=g\sin\varphi_1 \quad \text{Equation (6)}$$

and dividing Equation (6) by Equation (5) results in $$\sqrt{a_x^2+a_y^2}/a_z=g\sin\varphi_1/g\cos\varphi_1=\tan\varphi_1 \quad \text{Equation (7)}$$

Therefore, taking the arctangent of Equation (7) leads to $$\varphi_1=\tan^{-1}(\sqrt{a_x^2+a_y^2}/a_z) \quad \text{Equation (1)}$$

For the second angular rotation $\varphi_2$, dividing $a_y$ (Equation (4)) by $a_x$ (Equation (3)) leads to $$\frac{a_y}{a_x}=[(g\sin\varphi_1)\sin\varphi_2/\{(g\sin\varphi_1)\cos\varphi_2\}] \quad \text{Equation (8)}$$

$$=\sin\varphi_2/\cos\varphi_2$$

$$=\tan\varphi_2$$

Therefore, tanking the arctangent of Equation (8) leads to $$\varphi_2=\tan^{-1}(a_y/a_x) \quad \text{Equation (2)}$$

At 508, the angular orientation of the torch 50 of the welding system 10 can be calibrated so that the welding system 10 can be used for welding the workpiece 54.

Generally, a uniform reference coordinate system can be defined by the manufacturer by defining $\vec{k}^{(0)}=\vec{g}/g$ and defining $\vec{i}^{(0)}$ in any direction of their choice as long as $\vec{k}^{(0)}$ and $\vec{i}^{(0)}$ are orthogonal. $\vec{j}^{(0)}$ can then be uniquely determined to form a right-hand coordinate system ($\vec{i}^{(0)}=\vec{x}^{(0)}$, $\vec{j}^{(0)}=\vec{y}^{(0)}$, $\vec{k}^{(0)}=\vec{z}^{(0)}$) as the reference coordinate system 410 for the manufacturer, where $\vec{k}^{(0)}$ is equivalent to $\vec{z}^{(0)}$.

Then for any $(\varphi_1, \varphi_2)$ corresponding to ($\vec{i}=\vec{x}$, $\vec{j}=\vec{y}$, $\vec{k}=\vec{z}$), the projections of $\vec{g}$ in ($\vec{i}$, $\vec{j}$, $\vec{k}$), i.e., $(a_x, a_y, a_z)$, can be calculated. Alternatively, a mapping of the first and second rotational angles $(\varphi_1, \varphi_2)$ to the acceleration vectors $(a_x, a_y, a_z)$ can be established using a look-up table. Therefore, each time a calibration is performed, the first and second rotational angles $(\varphi_1, \varphi_2)$ can be determined from the accelerometer 320 outputs in real-time from the look-up table. A look-up table may be, for example, the look-up table 328c. The look-up table 328c may be sent by or downloaded from a system external to the welding system 10 such as, for example, the system 330. The look-up table 328c may also be generated by the welding system 10.

When the first and second rotational angles $(\varphi_1, \varphi_2)$ are known, the orientation of the torch 50 in relation to the reference coordinate system 410 is known, as shown above.

That is, when the first and second rotational angles $(\varphi_1, \varphi_2)$ are known, ($\vec{i}$, $\vec{j}$, $\vec{k}$) can each be expressed in terms of ($\vec{i}^{(0)}$, $\vec{j}^{(0)}$, $\vec{k}^{(0)}$) Accordingly, when the accelerometer 320 outputs $a_x$, $a_y$, $a_z$ are known, the acceleration vectors in the reference coordinate system 410 can be determined by $a_x\vec{i}+a_y\vec{j}+a_z\vec{k}=\vec{g}+\vec{g}_t=a_x^{(0)}\vec{i}^{(0)}+a_y^{(0)}\vec{j}^{(0)}+a_z^{(0)}\vec{k}^{(0)}$, where $\vec{g}_t$ is the torch acceleration.

Hence, $\vec{g}_t=a_x^{(0)}\vec{i}^{(0)}+a_y^{(0)}\vec{j}^{(0)}+(a_z^{(0)}-g)\vec{k}^{(0)}$. Accordingly, $(a_x^{(0)}, a_y^{(0)}, (a_z^{(0)}-g))$, which is the projections of acceleration of the torch 50 in three directions in the reference coordinate system 410, can be used to calculate the movements of the torch in three dimensions to determine its velocity and/or position.

At each calibration for the first and second rotational angles $(\varphi_1, \varphi_2)$, the rotations for the gyroscope 322 are known for computation using the outputs from the gyroscope 322. These rotations can also be calibrated using the first and second rotational angles $(\varphi_1, \varphi_2)$ but such calibration is not needed. As an example, consider that this is the $k^{th}$ calibration and this calibration has $(\varphi_1(k), \varphi_2(k))$ for the orientation of the IMU 306, gyroscope rotations ($\theta_x(k)$, $\theta_y(k)$, $\theta_z(k)$), and the drifts ($\delta\omega_x(k)$, $\delta\omega_y(k)$, $\delta\omega_z(k)$). Then the rotations before the $(k+1)^{th}$ calibration ($\theta_x$, $\theta_y$, $\theta_z$) can be determined from ($\theta_x(k)$, $\theta_y(k)$, $\theta_z(k)$) as the initial gyroscope outputs ($\omega_x$, $\omega_y$, $\omega_z$) and the drifts $\delta\omega_x(k)$, $\delta\omega_y(k)$, $\delta\omega_z(k)$). Once ($\theta_x$, $\theta_y$, $\theta_z$) are updated, the updated ($\theta_x$, $\theta_y$, $\theta_z$) can be used to update ($\varphi_1$, $\varphi_2$) from ($\varphi_1(k)$, $\varphi_2(k)$).

At 510, after calibration using the first and second rotational angles ($\varphi_1$, $\varphi_2$), usage of the welding system 10 starts or continues, as may be the case. The torch 50 can now be tracked more accurately after the calibration. The torch 50 can be tracked to provide, for example, feedback during welding training where the trainee is learning to hold the torch 50 at the correct angle and move the torch 50 at the correct speed. In a normal training mode the torch 50 may not be active in that no power is provided for welding, or power may be provided to the torch 50 in a "realistic" training mode. The feedback can be in real time with output, for example, to the display 304. Additionally, or alternatively, the feedback can also be stored, for example, in memory 328 for viewing at a later time by the trainee and/or others. Accordingly, the stored feedback information can be streamed and/or downloaded from the memory 328 to a viewing system (not shown), which may be part of the system 330.

The real-time feedback for the welding system 10 can also be used in a non-training welding system 10 to help keep the welder within tolerance for speed and position of the torch 50 while welding. Calibration of the welding system 10 can also be used to control a welding robot (not shown) in its automated welding of a workpiece. The calibration prior to starting a welding job and during a welding job can help the welding robot weld accurately.

The calibration of the welding system 10 can be used to make feedback more accurate, and this feedback, whether real-time or delayed, can also be used to provide a summary to certify that the workpiece has been welded using the correct procedure. The summary may provide, for example, a diagram showing the speed and angle of the torch 50 during welding of the workpiece, as well as when calibration(s) took place.

Various embodiments of the disclosure may have the welding system 10 support training mode, whether with real time feedback and/or delayed feedback, and/or non-training mode.

While various usages for calibration have been described with respect to welding, the embodiments of the disclosure need not be so limited. For example, the calibration process described can be used for any tool or system that needs to keep track of its three-dimensional location and orientation.

Figure 6:
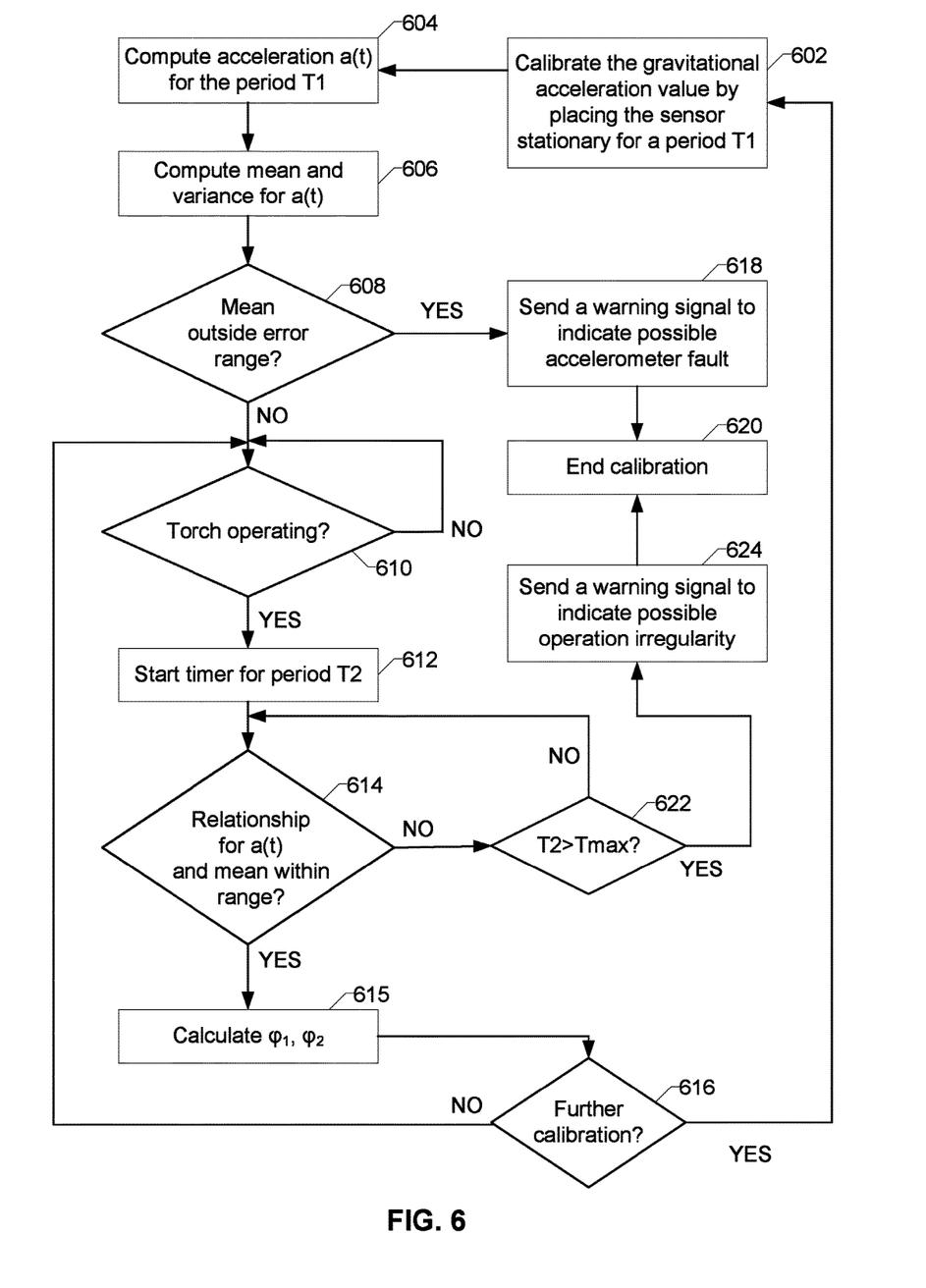
FIG. 6 is an exemplary flow diagram for calibrating an inertial measurement unit in accordance with aspects of this disclosure.

FIG. 6 is an exemplary flow diagram for calibrating an inertial measurement unit in accordance with aspects of this disclosure. Referring to FIG. 6, the accelerometer 320 can be calibrated with the following procedure under control of, for example, the microprocessor 324. At 602, calibration starts by measuring the gravitational acceleration after placing the torch 50 in a stationary position for a period T1. The period T1 may be a pre-determined time of, for example, less than or equal to 3 seconds. The measurement may be a continuous measurement or periodic measurements during the period T1.

At 604, the acceleration a(t) is calculated as $$a(t) = \sqrt[2]{a_x^2(t) + a_y^2(t) + a_z^2(t)}$$

during the period T1. At 606, the mean $\bar{a}$ and variance $\sigma^2$ are calculated for a(t) during the period T1. The mean $\bar{a}$ will be used as a pre-determined or pre-calibrated estimate of the amplitude of the gravitational acceleration, i.e., $\bar{a}=\hat{g}$. At 608, if the absolute value of the difference between the mean $\bar{a}$ and the theoretical value of the local gravitational acceleration g is larger than a pre-determined threshold value, a notification is sent at 618 to indicate possible fault for the accelerometer 320. The notification may be sent by, for example, the IMU 306. The notification may be sent to the display 304, the output interface 220, and/or the system 330. The calibration process then ends at 620.

Otherwise, if the absolute value of the difference between the mean $\bar{a}$ and the theoretical value of the local gravitational acceleration g is less than or equal to a pre-determined threshold value the torch 50 is checked at 610 to see if it is in operation. If not, there are further checks at 610 until the torch 50 is in operation. If the torch 50 is operating, then a timer is started at 612 to time a period T2.

At 614, a check is done to see when $(a(t)-\bar{a})^2 \leq 4\sigma^2$ is at a local minimum. If $(a(t)-\bar{a})^2 > 4\sigma^2$, the calibration should not be performed. If a local minimum where $(a(t)-\bar{a})^2 \leq 4\sigma^2$ is found, then the first and second rotational angles ($\varphi_1$, $\varphi_2$) are computed at 615 for calibration of the accelerometer 320. At 616 a determination is made whether further calibration should be made for the pre-estimated gravitational acceleration amplitude $\hat{g}$. Re-calibration for the pre-estimated gravitational acceleration amplitude $\hat{g}$ may be made as needed. Re-calibration may be needed, for example, when the altitude has changed. If a re-calibration is not to be made, the welding system 10 will continue the welding/training session at 610. If there is to be further calibration, then calibration process is performed again at 602.

Furthermore, after calibration, further outputs from the accelerometer 320 and/or other sensors in the IMU 306 can be used to keep track of the orientation, velocity, and/or position of the torch 50.

At 614, if local minimum for $(a(t)-\bar{a})^2 \leq 4\sigma^2$ is not detected then the timer is checked at 622 to see if the period T2 has been exceeded. If so, a notification is sent at 624 to indicate possible operation irregularity. The notification may be sent by, for example, the IMU 306. The notification may be sent to the display 304, the output interface 220, and/or the system 330. The calibration process then ends at 620.

At 622, if the period T2 has not been exceeded, then a local minimum for $(a(t)-\bar{a})^2 \leq 4\sigma^2$ is looked for again at 614. The local minimum may be looked for continuously or periodically after 622.

While the microprocessor 324 has been described as performing various processing for calibrating the orientation of the IMU 306, it should be understood that this is just an example. The processing may be done by another processor such as, for example, the controller 56, the torch controller 302, or jointly by some combination of the controller 56, the torch controller 302, and the microprocessor 324. Other embodiments may have different configurations where other processor(s)/controller(s) may do the processing. For example, the system 330 may be involved in the processing or control of the processing. Accordingly, it can be seen that executable instructions may be stored in the memory of the welding system 10. For example, the instructions may be stored in the memory device 58, the storage device 60, and/or the memory 328.

By directly calibrating the sensor body orientation in relation to the reference coordinate system, there is no need to use outputs from other sensor devices such as, for example, a gyroscope and/or a magnetometer. Additionally, there may be improved accuracy in calibrating the sensor body orientation as opposed using outputs from other sensors. Accordingly, the various embodiments of the disclosure using the two rotation angles to realize the sensor orientation may introduce more accuracy and savings by using fewer parts if the magnetometer is not included as a part of the IMU 306.

Various embodiments of the disclosure can use the calibration method as disclosed for a welding process to help the welder weld properly, or with a robot welder (not shown) to guide it accurately as it automatically welds a workpiece. While welding was specifically described to give a clearer picture of one use, various embodiments of the disclosure need not be so limited. Accordingly, the disclosure can be used with other tools and/or systems that need to calibrate its angular orientation for tracking its velocity, position, and/or angular orientation.

The present methods and systems may be realized in hardware, software, and/or a combination of hardware and software. The present methods and/or systems may be realized in a centralized fashion in at least one computing system or in a distributed fashion where different elements are spread across several interconnected computing systems. Any kind of computing system or other apparatus adapted for carrying out the methods described herein is suited. A combination of hardware and software may include a general-purpose computing system with a welding specific program or other code that, when being loaded and executed, controls the computing system such that it carries out the methods described herein. Another implementation may comprise one or more application specific integrated circuit or chip designed for welding. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") that may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed:

1. A welding system, comprising:
   a sensor, mounted rigidly to a welding torch, configured to output a first output, a second output, and a third output corresponding to a first axis, a second axis, and a third axis of a coordinate system, respectively, wherein the first axis, the second axis, and the third axis are mutually orthogonal to each other; and
   a welding controller configured to:
      determine, based on the first output, the second output, and the third output, a first rotational angle for the sensor to determine a first intermediate coordinate system with respect to a reference coordinate system, and a second rotational angle for the sensor to determine a second intermediate coordinate system with respect to the first intermediate coordinate system; and
      calibrate an orientation of the sensor based on the second intermediate coordinate system.

2. The welding system of claim 1, wherein at least one of a velocity of the sensor, the orientation of the sensor, and a position of the sensor is determined based on the calibrated orientation and further updates of the first output, the second output, and the third output from the sensor.

3. The welding system of claim 1, wherein the sensor is a tri-axial accelerometer and the welding system does not include a magnetometer.

4. The welding system of claim 1, wherein the welding controller does not use a magnetometer output.

5. The welding system of claim 1, wherein the welding controller is configured to determine the first intermediate coordinate system as the reference coordinate system rotated around its second axis by the first rotational angle, and to determine the second intermediate coordinate system as the first intermediate coordinate system rotated around its third axis by the second rotational angle.

6. The welding system of claim 1, wherein the welding controller is configured to determine the calibrated orientation when the first output, the second output, and the third output indicate constant acceleration.

7. The welding system of claim 6, wherein the welding controller is configured to determine the first rotational angle using $\varphi_1 = \tan^{-1}(\sqrt{a_1^2 + a_2^2}/a_3)$, wherein $\varphi_1$ is the first rotational angle, $a_1$ is the first output, $a_2$ is the second output, and $a_3$ is the third output.

8. The welding system of claim 6, wherein the welding controller is configured to determine the second rotational angle using $\varphi_2 = \tan^{-1}(a_2/a_1)$, wherein $\varphi_2$ is the second rotational angle, $a_1$ is the first output, and $a_2$ is the second output.

9. The welding system of claim 6, wherein the welding controller is configured to determine the first rotational angle and the second rotational angle via a lookup table based on the first output, the second output, and the third output.

10. The welding system of claim 9, wherein the welding system is configured to receive the lookup table from an external source.

11. The welding system of claim 9, wherein the welding controller is configured to generate the lookup table.

12. The welding system of claim 1, further comprising a robot controller to control a robot holding the welding torch, the welding controller configured to control the welding torch based on the orientation of the sensor.

13. A non-transitory machine-readable medium storing machine executable instructions that, when executed, cause a processor to determine an orientation of a sensor mounted rigidly to a tool with respect to a reference coordinate system for controlling the tool by:
    determining, based on a first output, a second output, and a third output of the sensor, a first rotational angle for the sensor to determine a first intermediate coordinate system with respect to the reference coordinate system, wherein the first output, the second output, and the third output correspond to a first axis, a second axis, and a third axis of a coordinate system, respectively, that are mutually orthogonal to each other;
    determining, based on the first output, the second output, and the third output, a second rotational angle for the sensor to determine a second intermediate coordinate system with respect to the first intermediate coordinate system; and
    calibrate an orientation of the sensor based on the second intermediate coordinate system.

14. The non-transitory machine-readable medium of claim 13, further comprising instructions that cause the processor to determine at least one of the orientation of the sensor, a velocity of the sensor, and a position of the sensor based on the calibrated orientation and further updates of the first output, the second output, and the third output from the sensor.

15. The non-transitory machine-readable medium of claim 13, wherein the instructions cause the processor to determine the relationship between the reference coordinate system and the second intermediate coordinate system as the reference coordinate system rotated around its second axis by the first rotational angle to form the first intermediate coordinate system, and the first intermediate coordinate system rotated around its third axis by the second rotational angle.

16. The non-transitory machine-readable medium of claim 13, wherein the first output, the second output, and the third output are from an accelerometer, and the instructions cause the processor to determine the orientation of the sensor without using a magnetometer output.

17. The non-transitory machine-readable medium of claim 13, wherein the instructions cause the processor to determine the calibrated orientation when the first output, the second output, and the third output indicate constant acceleration.

18. The non-transitory machine-readable medium of claim 17, wherein the instructions cause the processor to determine the first rotational angle using $\varphi_1 = \tan^{-1}(\sqrt{a_1^2 + a_2^2}/a_3)$ and determine the second rotational angle using $\varphi_2 = \tan^{-1}(a_2/a_1)$, wherein $\varphi_1$ is the first rotational angle, $\varphi_2$ is the second rotational angle, $a_1$ is the first output, $a_2$ is the second output, and $a_3$ is the third output.

19. The non-transitory machine-readable medium of claim 13, wherein the instructions cause the processor to determine the first rotational angle and the second rotational angle via a lookup table based on the first output, the second output, and the third output.

20. A system without a magnetometer, comprising:
    a rigidly mounted sensor configured to output a first output, a second output, and a third output corresponding to a first axis, a second axis, and a third axis of a coordinate system, respectively, wherein the first axis, the second axis, and the third axis are mutually orthogonal to each other; and
    a processor configured to:
        determine, based on the first output, the second output, and the third output, a first rotational angle for the sensor to determine a first intermediate coordinate system with respect to a reference coordinate system, and a second rotational angle for the sensor to determine a second intermediate coordinate system with respect to the first intermediate coordinate system; and
        calibrate an orientation of the sensor based on the second intermediate coordinate system.

21. The system according to claim 20, wherein at least one of the orientation of the sensor, a velocity of the sensor, and a position of the sensor is determined based on the calibrated orientation and further updates of the first output, the second output, and the third output from the sensor.

22. The system according to claim 20, wherein the processor is further configured to generate a weld training output based on calibrated outputs from the sensor.

* * * * *